United States Patent [19]
Cyr et al.

[11] Patent Number: 5,412,646
[45] Date of Patent: May 2, 1995

[54] ASYNCHRONOUS TRANSFER MODE SWITCH ARCHITECTURE

[75] Inventors: Gregory J. Cyr, Winfield; Kurt A. Hedlund, Oak Park, both of Ill.; Lawrence J. Nociolo, Fair Haven, N.J.; Mark A. Pashan, Wheaton, Ill.; Albert Kai-sun Wong, Edison, N.J.

[73] Assignee: AT&T Corp., Murray Hill, N.J.

[21] Appl. No.: 242,217

[22] Filed: May 13, 1994

[51] Int. Cl.⁶ .......................................... H04L 12/56
[52] U.S. Cl. ........................... 370/56; 370/60; 370/61
[58] Field of Search ................ 370/53, 55, 56, 58.1, 370/58.2, 58.3, 60, 60.1, 61, 94.1, 94.2

[56] References Cited

U.S. PATENT DOCUMENTS

| | | | |
|---|---|---|---|
| 4,955,016 | 9/1990 | Eng et al. | 370/60 |
| 4,955,017 | 9/1990 | Eng et al. | 370/60 |
| 5,148,428 | 9/1992 | Lee | 370/60 |
| 5,172,371 | 12/1992 | Eng et al. | 370/60 |
| 5,253,251 | 10/1993 | Aramaki | 370/60 |
| 5,256,958 | 10/1993 | Eng et al. | 370/56 |

*Primary Examiner*—Alpus Hsu
*Attorney, Agent, or Firm*—Frederick B. Luludis

[57] ABSTRACT

A high capacity packet switch is implemented using an expansion module that divides an incoming packet cell into a plurality of segments and supplies the segments, based on their sequential order, to respective ones of a plurality of concentrator units contained in the expansion module. Each concentrator unit includes a plurality of concentrator logic units and one of those logic units accepts a segment for storage based on routing information contained in the packet cell. The stored segments forming a packet cell are thereafter unloaded and recombined in proper sequence for routing to a packet switch module, which then forwards the packet cell toward its destination.

8 Claims, 8 Drawing Sheets

FIG. 7 FIFO CONTROL

ASYNCHRONOUS TRANSFER MODE SWITCH ARCHITECTURE

FIELD OF THE INVENTION

The invention relates to packet switching systems and more particularly relates to an architecture for an asynchronous transfer mode switch.

BACKGROUND OF THE INVENTION

The commercial success of an Asynchronous Transfer Mode (ATM) switch hinges on whether the switch is "growable"—meaning that the switching capacity of the switch may be expanded to handle an increase in bandwidth. For example, U.S. Pat. No. 5,256,265 discloses an architecture for an ATM switch which may grow (expand) from an $8\times 8$ packet switch to a $32\times 32$ packet switch, as shown in FIG. 1. One drawback of such an architecture is that when the capacity of the switch is expanded, the required concentration access speed increases proportionately. Another drawback is that the bandwidth data rate at the output of an expansion unit 404 becomes k times the input bandwidth data rate of the switch, where k is the number of $8\times 8$ packet switch modules employed at the output of the switch. For example, for an nxn switch, then the expansion bandwidth is kxnxR, where R is the input bandwidth of each line and is typically 2.4 gigabits/sec. Since k is proportional to the size of an ATM switch, i.e., k is proportional to n, then it can be appreciated that the bandwidth of the interconnection between the expansion unit 404 and associated concentrators 101 grows as the square of the size of the switch and, therefore, becomes unwieldy to implement when the size of the ATM switch is increased.

SUMMARY OF THE INVENTION

We have recognized that the interconnection bandwidth between the expansion unit 404 and associated concentrators 101 may be readily managed by constructing an ATM switch such that the interconnection is contained within integrated circuit devices, rather than being external to the devices, as is done in the prior art. To achieve this, the expansion and concentration functions for the ATM switch are contained, in accord with an aspect of the invention, on the same device. We have recognized, however, that the current level of technology does not permit integration of the expansion and concentration functions on a single device for a high capacity ATM switch. We overcome this limitation, in accord with another aspect of the invention, by providing an ATM switch architecture in which each device processes a particular segment (slice) of every incoming cell, rather than the entire cell.

Moreover, the decrease in concentrator access time that occurs as a result of an increase in the bandwidth (capacity) of an ATM switch may be readily dealt with, in accordance with an aspect of the invention, by using in each concentrator unit a plurality of parallel First In, First Out (FIFO) memory circuits, rather than just a single memory circuit.

DETAILED DESCRIPTION

Figure 2:
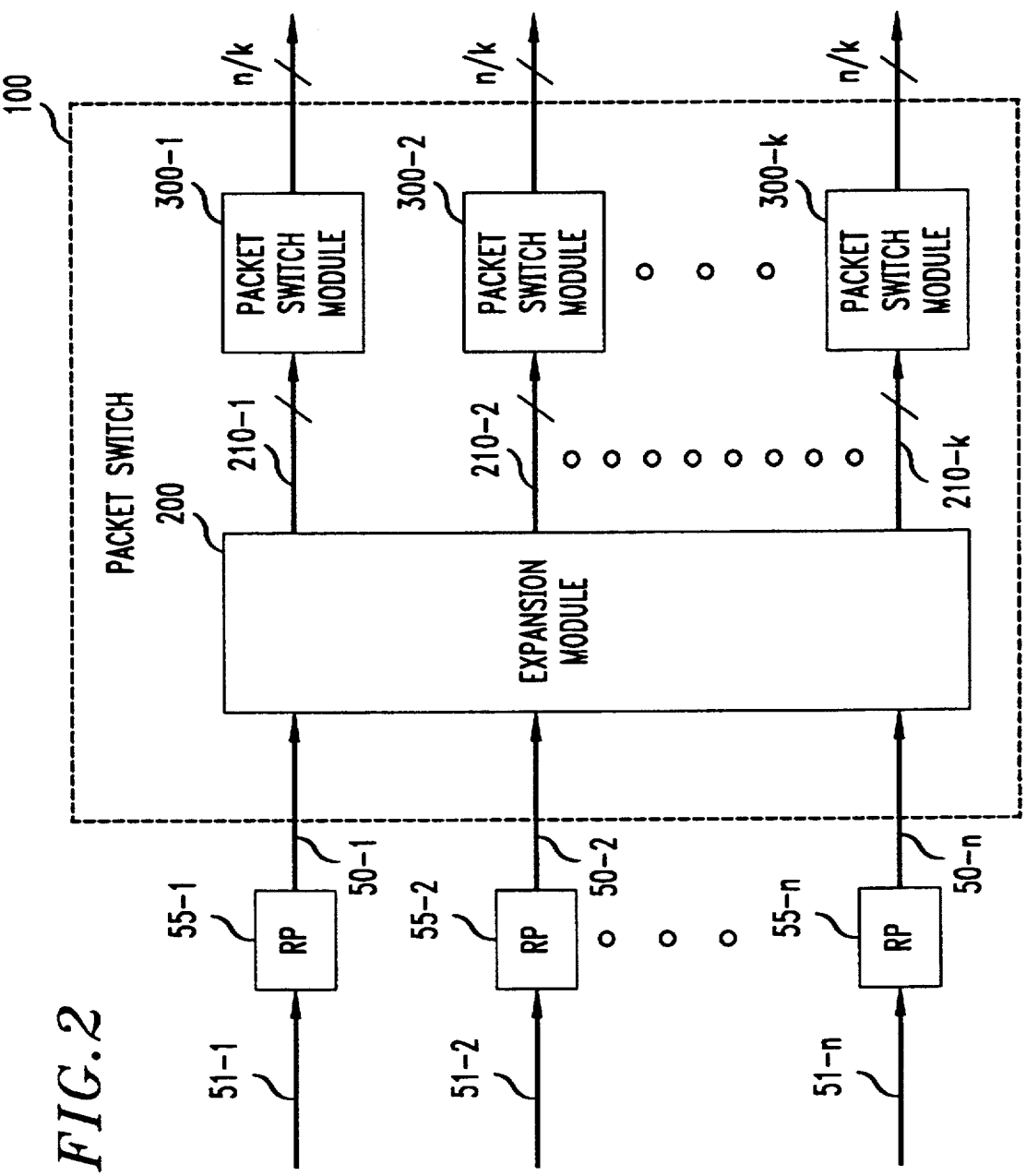
FIG. 2 is a broad block diagram of an ATM switch arranged in accord with the principles of the invention.

ATM switch 100 shown in FIG. 2 comprises an expansion module 200 that receives n inputs, each providing a stream of ATM cells at a predetermined maximum rate of, e.g., 2.4 Gb/s. Each input is interconnected internally to the expansion module 200 (shown below) via a respective one of the routing processors 55-1 through 55-n. A routing processor 55, responsive to receipt of a cell via an associated data path, prepends to the cell header routing information identifying a particular one of the packet switch modules 300-1 through 300-k that will forward the cell to its intended destination. (In a multicasting situation, the routing information would identify more than one packet switch module, which would then forward the cell to a number of different destinations.) The resulting cell is then supplied to the concentrator units contained in expansion module 200. The outputs of the concentrators are then supplied to respective packet switch modules 300-1 through 300-k based on the prepended routing information. It is noted that many techniques are known for implementing a packet switch module 300. For example, see U.S. Pat. Nos. 4,603,416, 5,233,606 and 5,278,969 which disclose examples of such packet switch modules.

Figure 3:
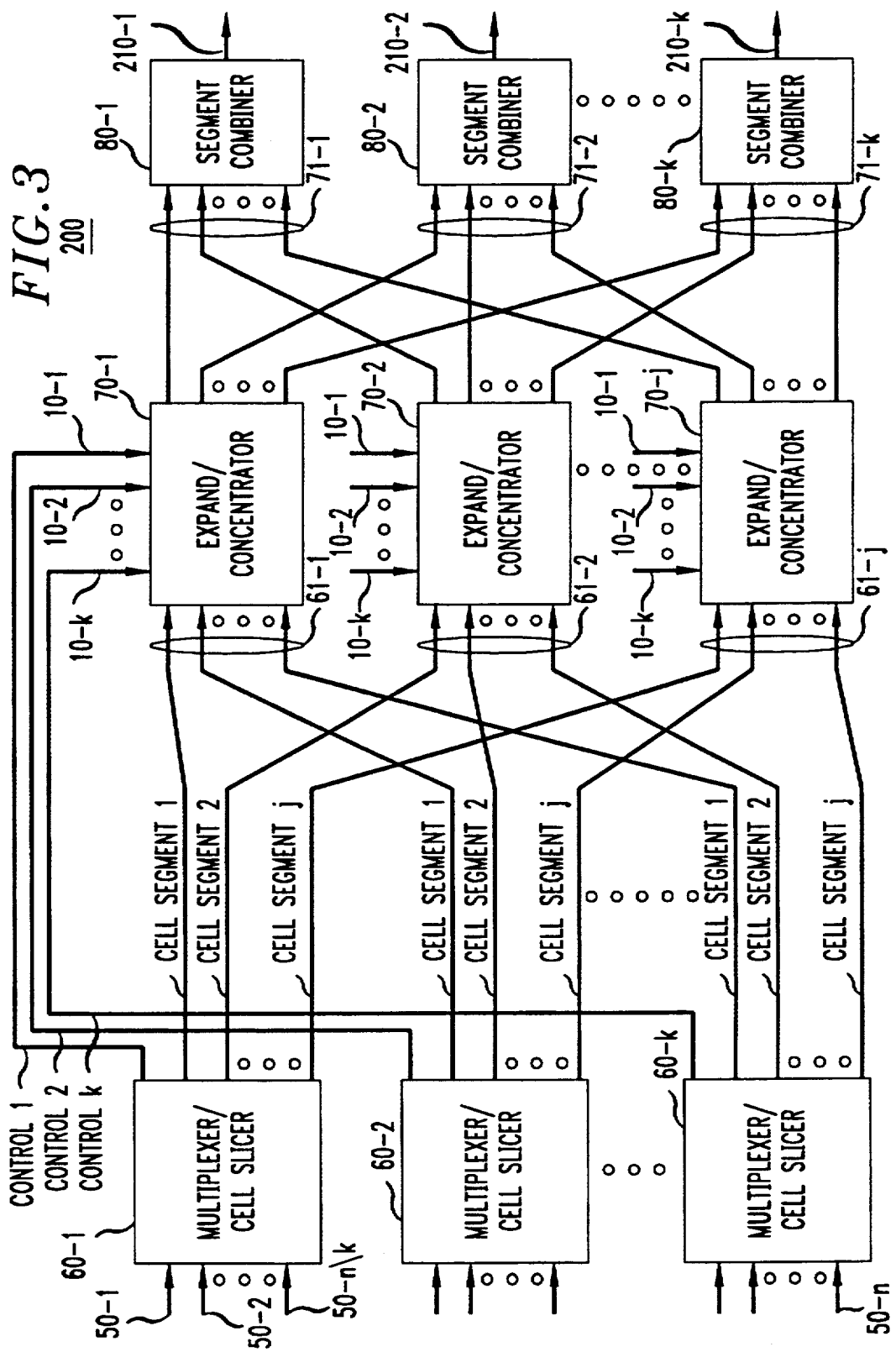
FIG. 3 is a block diagram of the expansion module of FIG. 2.

Expansion module 200, more particularly, includes a plurality of conventional cell multiplexer/cell slicer units 60-1 through 60-k, a plurality of expand/concentrator units 70-1 through 70-j and a plurality of conventional segment combiner circuits 80-1 through 80-k, as shown in FIG. 3. Each multiplexer/cell slicer unit, e.g., unit 60-1, serves n/k inputs such that a stream of data cells may be received via each input. When a cell is received at one of its inputs, a multiplexer/cell slicer unit 60, e.g., unit 60-1, "strips off" the aforementioned prepended routing information and supplies the information to each expand/concentrator unit 70 via an associated one of the multilead busses 10-1 through 10-k. For example, the leads of multilead bus 10-1 respectively connect to expand/concentrator units 70-1 through 70-j. Accordingly, unit 60-1 distributes the routing information that it receives to each of the units 70-1 through 70-j. Each unit 70-1 through 70-j thus receives routing information relating to respective cells from each of the units 60-1 through 60-k.

Each multiplexer/cell slicer unit 60 also multiplexes the cells that it receives via its associated inputs into a single stream of cells having a bandwidth of Rn/k, where R, as mentioned above, is the bandwidth of each input line, n is the total number of inputs 50 and k is the number of packet switch modules 300. Cell multiplier/- cell slicer unit 60 then segments each multiplexer cell into j segments and supplies the segments to expand-/concentrator circuits 70-1 through 70-j, respectively. For example, a first segment is supplied to circuit 70-1, a second segment is supplied to circuit 70-2, a third segment is supplied to circuit 70-3 (not shown) and so on. This aspect is represented in FIG. 3 by designations 61-1 through 61-k, in which a plurality of connections 61-1 originate from units 60-1 through 60k, respectively.

Figure 1:
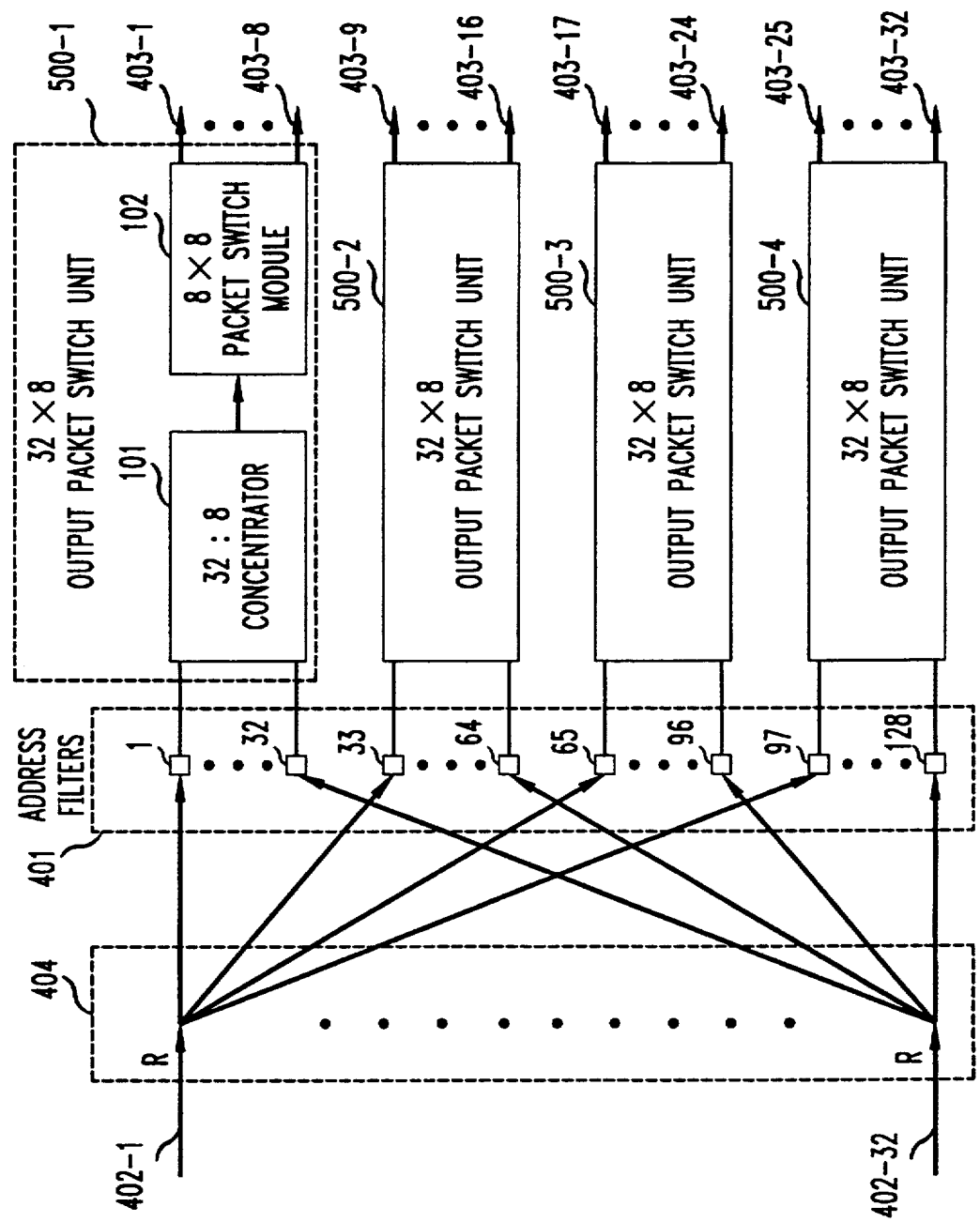
FIG. 1 is a broad block diagram of a prior art ATM switch.

Specifically, when a segment arrives at the input of an expand/concentrator unit 70, the segment "fans out" to k Concentrator Logic Units (CLUs). Such fan out of a segment is, in accord with an aspect of the invention, internal to the expand/concentrator unit 70. (This is in contrast to the prior art in which the fan out is disposed external to a concentrator unit, as shown in FIG. 1, i.e., the expansion between elements 404 and 401.) Each CLU of a unit 70, FIG. 3, then either accepts and stores or discards the segment that it receives at its input based on the associated routing information received via a lead of a respective one of the control busses 10-1 through 10-k. Each expand/concentrator 70, in turn, concentrates the segments that it accepts via respective ones of its k inputs into streams of segments and forwards the streams to respective ones of the segment combiner circuits 80-1 through 80-k. Each segment combiner circuit 80 accepts segments from each of the expand/concentrator units 70 and combines associated segments into an ATM cell. The combiner circuit 80 then forwards the packet to an associated packet switch module 300. A switch module 300, in turn, forwards the cell to a destination identified, directly or indirectly, in the cell header.

Figure 4:
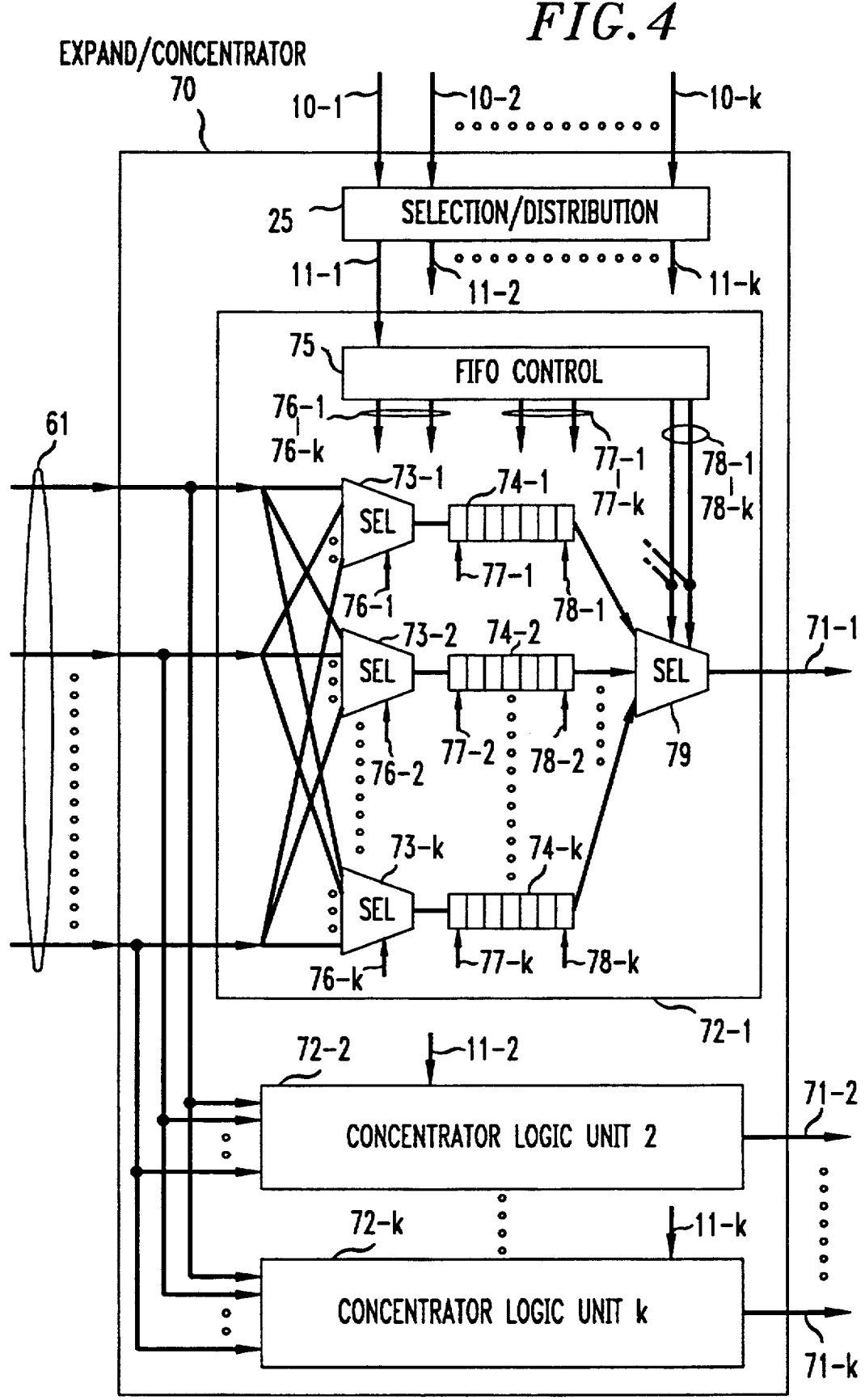
FIG. 4 is a block diagram of the expand/concentrator unit of FIG. 3.

As mentioned above, an expand/concentrator unit 70 includes k CLUs as shown in FIG. 4. As also mentioned above, a segment received at a unit 70 is fanned out, in accord with an aspect of the invention, to each of the CLUs 72-1 through 72-k. It is seen from FIG. 4 that a CLU, e.g., CLU 72-1, includes a plurality of input selector circuits 73-1 through 73-k each operating under the control of FIFO control circuit 75 to select one of the inputs and pass the selected input to an associated FIFO 74 for temporary storage therein. The storage and retrieval of a segment in a FIFO 74 is also under the control of circuit 75, as will be discussed below. Each FIFO 74, in turn, is associated with an input of output selector circuit 79, which also operates under the control of FIFO control circuit 75.

An expand/concentrator unit 70 also includes a selection/distribution circuit 25. The selection/distribution circuit 25, more particularly, associates routing information that it receives via each of the multi-lead busses 10 with a particular CLU, e.g., CLU 72-1. Circuit 25 then multiplexes the selected information onto respective leads of a multilead bus 11, e.g., bus 11-1, for presentation to the associated FIFO control circuit 75. Specifically, and as mentioned above, an expand/concentrator unit 70 receives routing information associated with a cell via one of the busses 10 and presents such information to its associated selection/distribution circuit 25 for processing and distribution over respective ones of the busses 11. In doing so, selection/distribution circuit 25 assembles the routing information contained on busses 10-1 through 10-k and then associates the information with cells destined for the same Concentrator Logic Units (CLUs), 72-i by "packing" such information onto the same control bus 11-i for delivery to the associated CLU. For example, the destination addresses for cells received via inputs 50-1 through 50-n/k are forwarded over control bus 10-1. That is, if cells received via inputs 50-2 through 50-n/k are to be forwarded to CLU 3, and cells received via all other inputs are to be forwarded to CLU 1, then selection/distribution 25, passes the destination information received (a) via input 50-1 and control bus 10-1 to control bus 11-1, (b) via inputs 50-2 through 50-n/k and control bus 10-1 to control bus 11-3, and (c) via all other inputs and control busses 10-2 through 10-k to control bus 11-1.

The associated FIFO control circuit 75, inter alia, controls (a) which input of a selector 73 is passed to its associated FIFO 74 via respective ones of busses 76-1 through 76-K, and (b) which FIFO 74 will store the inputed segment via respective ones of busses 77-1 through 77-k. Circuit 75 also controls via bus 78 which one of the FIFO's 74-1 through 74-K presents a cell segment to a respective input of selector 79, and controls which one of the selection 79 inputs is presented to the associated output 71, during a current system time slot.

FIFO control circuit 75 also operates to ensure that the storage of segments accepted via associated selectors 73 is done, in accord with an aspect of the invention, in round-robin fashion so that the storage of such segments is equally distributed across all of the FIFOs 74-1 through 74-k of a CLU. What this means is that when a number of segments are selected by respective ones of the selectors 73, then such segments are supplied, under the control of circuit 75, to associated ones of the FIFOs 74 for storage therein. Circuit 75 thus determines and controls via busses 76 and 77 which segments are stored in which FIFOs 74.

Figure 5:
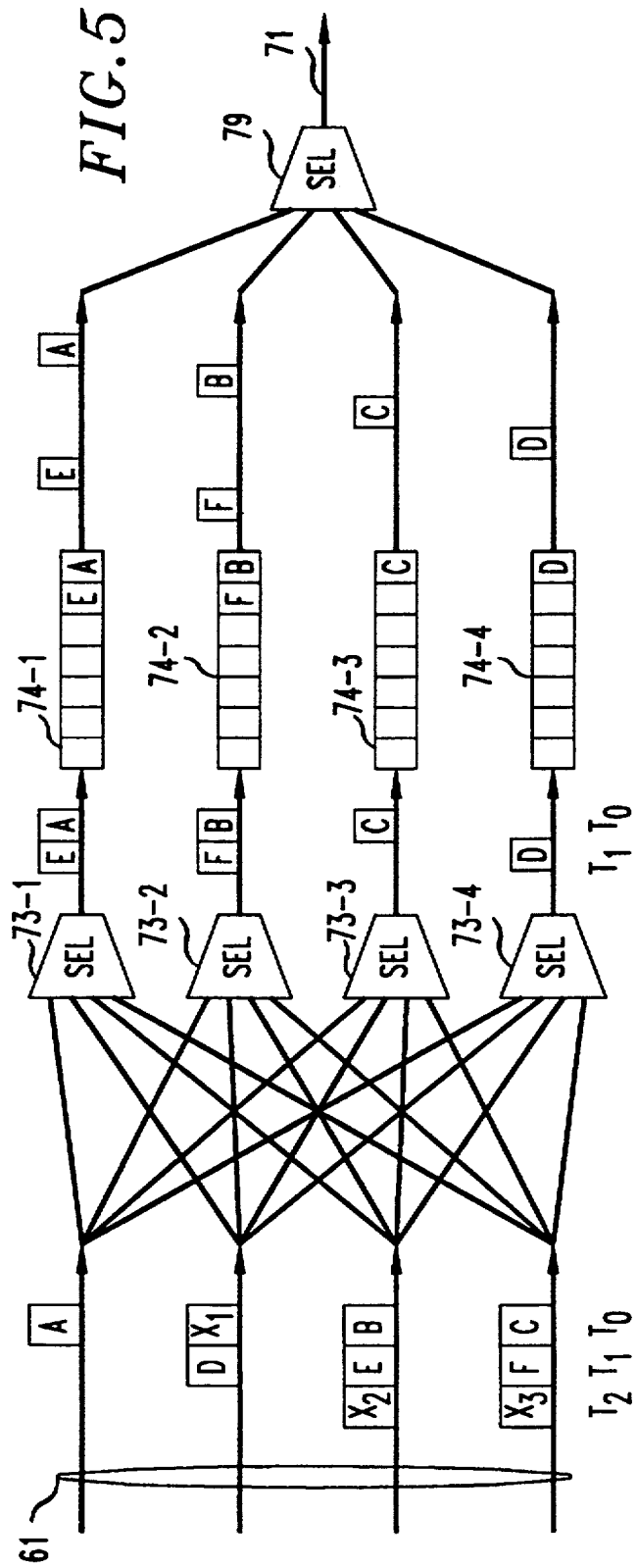
FIGS. 5 and 6 graphically illustrate the operation of an expand/concentrator unit of FIG. 4.

FIG. 5 illustrates in simplified form the way in which segments of various cells are stored in round-robin fashion in the FIFOs associated with a CLU, in which k=4. For brevity and clarity, the routing information carried by busses 10, selection/distribution 25, busses 11, FIFO control 75 and busses 76, 77 and 78 are not shown. It is to be understood, of course, that FIG. 5 and the following discussion is not to be taken as a limitation of our inventive architecture and is provided for the sole purpose of furthering an understanding of our invention.

Figure 6:
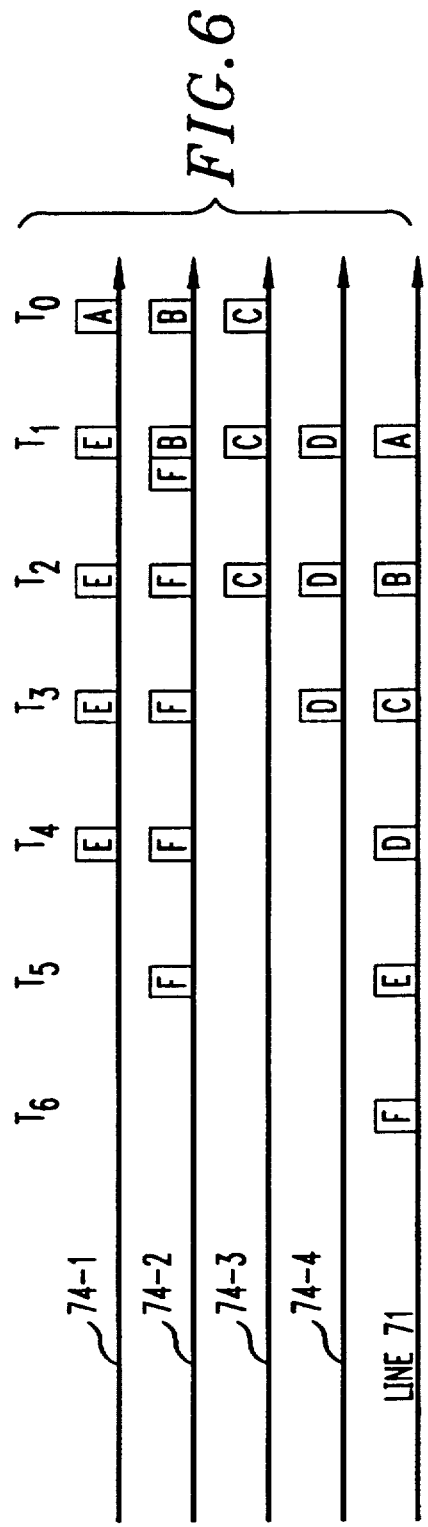

With that in mind, assume that during time slot T0 segments A, B, and C of respective cells are supplied via respective ones of leads 61 to each of the selectors 73-1 through 73-4 as shown in FIG. 5 (and as also shown in FIG. 4 for selectors 73-1 through 73-k.) Responsive to particular control signals issued by FIFO control 75 (not shown in FIG. 5), selectors 73-1, 73-2 and 73-3 select and output segments A, B and C, respectively. Similarly, FIFO control 75 directs FIFOs 74-1, 74-2 and 74-3 to respectively store segments A, B and C in their respective memories, but not segment $X_1$, since that segment may be destined for one or more packet switch modules, other than the one connected to bus 71. This will also be the case for segments $X_2$ and $X_3$ arriving at time slot $T_2$. This is shown in the time diagram of FIG. 6 for time slot $T_0$. Assume that during the next time slot $T_1$ cell segments D, E and F are supplied via respective leads 61 to each of the selectors 73. In the present instance and for the purpose of achieving the inventive aspect of equally distributing the load across all of the FIFOs 74, FIFO control 75 directs selectors 73-4, 73-1 and 73-2 to select and output segments D, E and F, respectively. Similarly, FIFO control 75 directs FIFO 74-4 to store segment D in its memory and directs FIFOs 74-1 and 74-2 to store segments E and F, respectively. In addition, FIFO control 75 directs FIFO 74-1 to output segment A to selector 79 for presentation to lead 71. The contents of FIFOs 74-1 through 74-4 is shown in FIG. 6 for time slot $T_1$, which indicates that segment A has been outputted to selector 79 and segments D, E and F have been stored in FIFOs 74-4, 74-1 and 74-2, respectively. The timing diagram also shows that during succeeding time slots $T_2$ through $T_6$ segments B through F are respectively outputted in sequence to selector 79 as also shown for lead 71, thus completing the concentrating function of the segments to the same lead.

Figure 7:
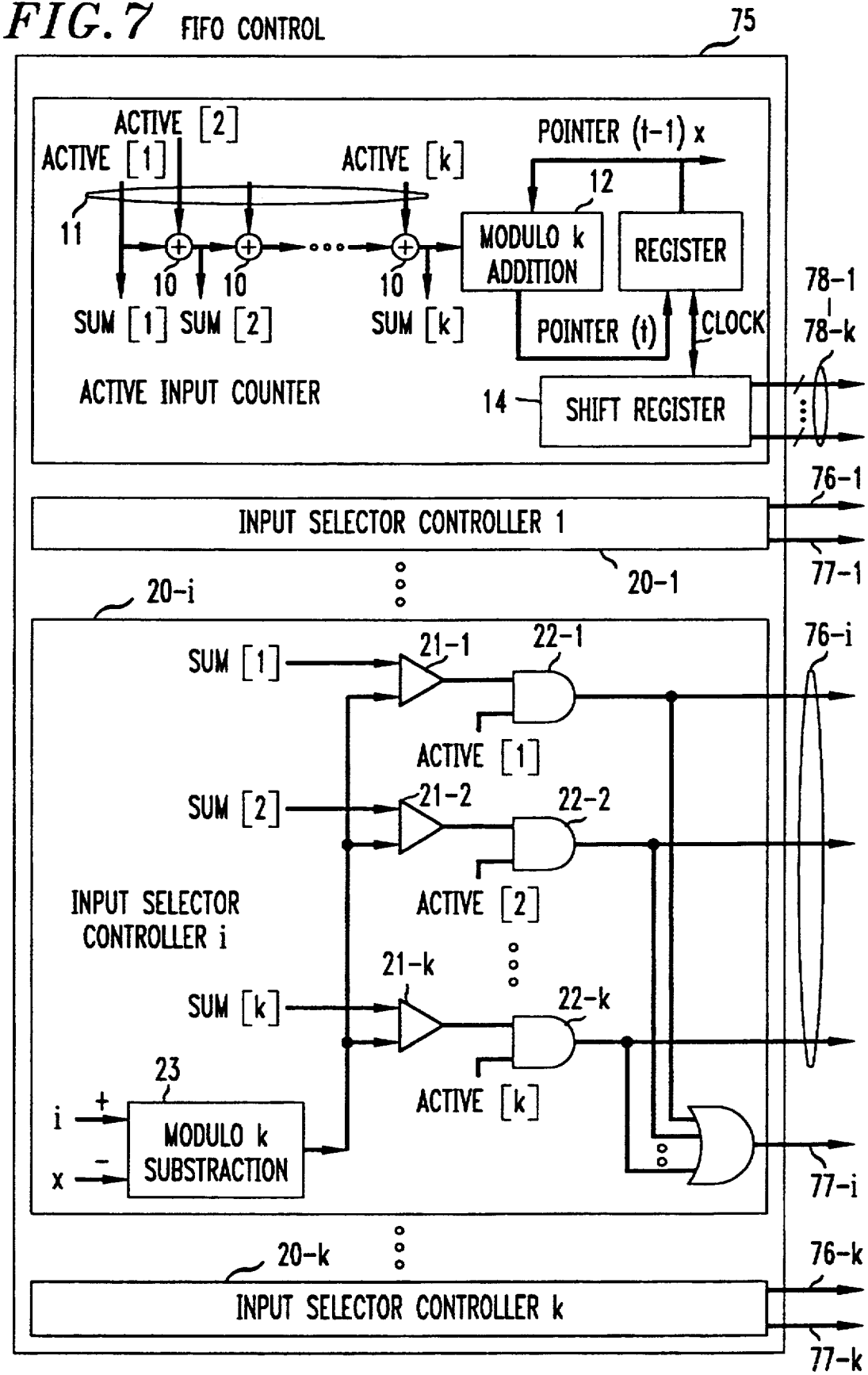
FIG. 7 is a functional block diagram of the FIFO control unit of FIG. 4.

A functional block diagram of FIFO control unit 75 is illustrated in FIG. 7. In particular, the inputs to a unit 75 comprises a k-bit bus 11. For each cell cycle, a bit within bus 11 is asserted as a "1" if the corresponding input of bus 61 contains a cell segment that is to be accepted and forwarded to an associated Packet Switch Module (PSM). The outputs of a FIFO control unit 75 include control busses 76 and 77 as well as control bus 78. Each bus 76-i is a k-bit bus that controls which input a corresponding selector 73-i selects. Control bus 77 is a k-bit but such that each lead 77-i is a 1-bit push control signal that controls whether a cell segment is "pushed" (stored) into the corresponding FIFO 74-i. Control bus 78 is also a k-bit bus such that each lead 78-i carries a one-bit pop signal that controls if a cell segment is to be "popped" (read) from the corresponding FIFO 74-i. Control bus 78 also controls which of the FIFO 74 outputs is selected by selector 79 for presentation to bus 71, as mentioned above. (Note that only one of the k bits in bus 78 is active at one time.) Specifically, assume that for a current cell cycle (time t) q of the inputs of a bus 61 contain a cell segment that is to be accepted and forwarded to the associated PSM. Also assume that a POINTER(t−1) contained in a register points to the FIFO 74 that last accepted an incoming cell segment during a previous cell cycle. Then, the FIFO control logic operates such that it ensures that the next cell received via the bus 61 will be stored in the FIFO 74 identified by the expression ((lc+1) modulo k), where lc is the contents of the POINTER(t−1) register. In line with the latter, then the following or second cell received via bus 61 will be stored in the ((lc+2) modulo k)th FIFO, and so on. In other words, tile logic operates to cause the selector 73 associated with the ((lc+1) modulo k)th FIFO to select tile first input of bus 61 that has an ACTIVE bit="1". During the same cell cycle then, the selector 73 associated with the FIFO identified by ((lc+2) modulo k) selects the next input appearing on the bus 61 whose associated ACTIVE bit="1", and so on. The POINTER(t) is then set to ((lc+q) modulo k) and t is incremented in preparation for the next cell cycle.

In addition, the push control signal 77-i for the ((lc+i)th FIFO is asserted if one of the leads of bus 76-i is asserted, i.e., the associated selector 73-i is in the process of selecting a cell segment via one of the inputs 61, so that the selected cell segment will be pushed into the corresponding FIFO; otherwise, the push control signal 77-i will be inactive. Control bus 78 is also updated so that the contents of the next FIFO is selected by selector 79 in round-robin fashion. Specifically, if the ith lead of bus 78 is asserted during time t, then the (i+1) modulo k th lead is asserted during time t+1.

More specifically, a breakdown of a FIFO control unit 75 functionally would include an active input counter and a plurality (e.g., k) selector controllers 20. The active input counter would include k summing circuits 10 for generating a set of outputs SUM[1] through SUM[k] such that SUM[j] is indicative of the number of active inputs from input 1 through input j. Also, the value SUM[k] is supplied to modulo k adder 12 so that the value of lc for the next cycle may be generated, as mentioned above. In addition, circulating shift register 14 includes k register circuits such that a bit is shifted from one register to a next register responsive to a clock signal as a way of activating a corresponding one of the leads of bus 78. An input selector controller 20, on the other hand, in a functional sense, would include k comparators 21, k "AND" circuits 22 and a modulo k subtracter 23. The modulo k subtracter generates a distance (i.e., an off-set value) of the ith selector from the last FIFO accessed in cell cycle t−1. For example, if k equals 8 and if the latter FIFO happened to be FIFO 3, then tile off-set value for selector controller 7 (1) would be 4 (6). The off-set value would then be compared with the set of outputs generated by the active input counter. If a match is found and tile associated active bit equals a value of one, then the corresponding "AND" gate would output a value of one to its associated lead 76. As such, at most only one lead 76 of a selector controller output would be active.

Figure 8:
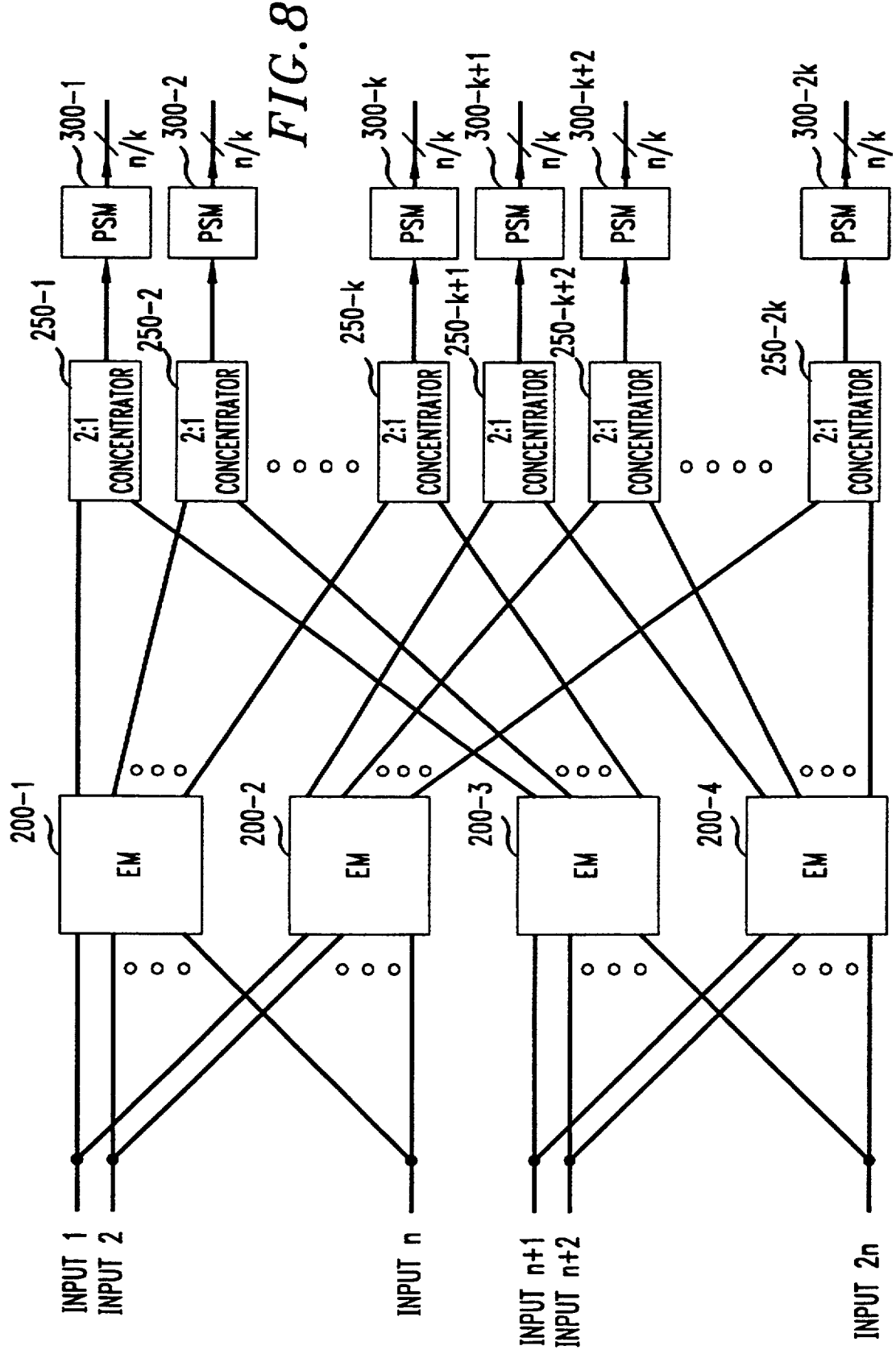
FIG. 8 illustrates in simplified block diagram form the way in which the ATM switch of FIG. 2 may be expanded to accommodate 2n inputs.

An important architectural aspect relating to an ATM switch is the requirement that the capacity of the switch may be readily expanded, e.g., doubled. FIG. 8 illustrates the way in which our inventive architecture may be expanded to double the capacity of the switch of FIG. 2. Specifically, we employ four expansion modules to double the capacity of the switch and thus double the number of input from n to 2n. As shown in FIG. 8, each of the n inputs is supplied to expansion modules 200-1 and 200-2 and each of the other n inputs is supplied to expansion modules 200-3 and 200-4. The outputs of expansion modules 200-1 and 200-3 are combined two at a time via a plurality (e.g., k) 2:1 concentrators 250-1 through 250-k, in the manner shown in FIG. 8. The design of a concentrator 250 is, therefore, functionally similar to that of a concentrator logic unit 72 (FIG. 4). In this way any one or more of the 2n inputs may be routed, in turn, to any one of the first plurality (k) of Packet Switch Modules (PSM) 300-1 through 300-k. Expansion modules 200-2 and 200-4 are arranged similarly so that any one or more of the 2n inputs may also be routed, in turn, to any one of the second plurality (k) of PSMs 300-k+1 through 300-2k.

Figure 9:
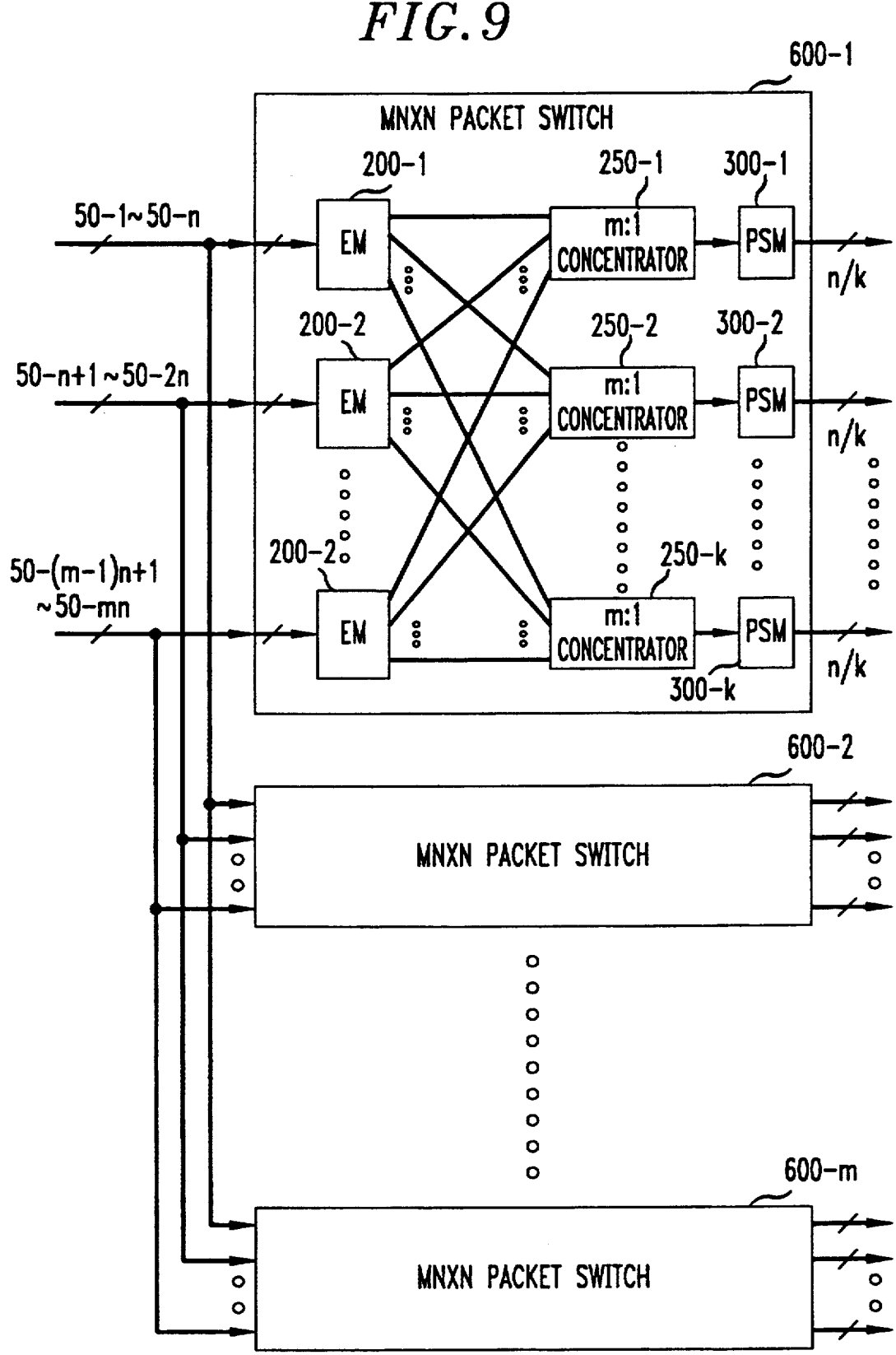
FIG. 9 illustrates in simplified block diagram form the way in which the ATM switch of FIG. 2 may be expanded into a mnxn switch.

FIG. 9 illustrates in generalized form the way in which our inventive architecture may be readily expanded by a factor of m times. That is, the switch architecture shown in FIG. 9 is a generalized form of the switch architecture shown in FIG. 8.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. An expansion module for use in a packet switch, said expansion module comprising:
   means for receiving a data cell via one of n inputs and for dividing said data cell into j sequential segments as it is being received, where j>1 and n>1,
   means for supplying said segments to respective ones of a plurality of concentrator units based on the sequential order of said segments, each of said concentrator units including k concentrator logic units and means for supplying a received segment to each of said k concentrator logic units, one of said concentrator logic units accepting the segment for storage therein based on routing information contained in the associated data cell, where k > 1, and means for unloading, in a prescribed order, the segments forming said cell from the concentrator logic units in which said segments are stored and recombining said segments to form said cell and then supplying the fortned cell to an associated one of k outputs selected as a function of said routing information.

2. The switch of claim 1 wherein each of said concentrator logic units comprises k memories arranged in parallel, and means for storing segments as they are accepted in individual ones of said memories in robin-robin fashion.

3. The switch of claim 2 wherein each of the k memories is a First In, First Out (FIFO) memory.

4. A packet switch comprising:

means for slicing a data cell received via one of n inputs into j segments and supplying the segments to respective ones of k concentrator units, each of the concentrator units having k groups of memories, in which the memories of each group are arranged in parallel and selected in a predetermined sequence, where j > 1, k > 1 and n > 1, means contained in each of said concentrator units for accepting the respective one of said segments at one of the associated k groups of memories based on a destination assigned to the associated data cell and temporarily storing the accepted segment in a selected one of the memories of said one of the associated k groups of memories, and means associated with each of said groups of memories for unloading in said predetermined sequence the segments stored in the memories of the associated group, combining unloaded segments from differents ones of said groups to form the respective data cell and then forwarding the data cell to its intended destination via one of a plurality of outputs selected as a function of the assigned destination.

5. The switch of claim 4 wherein each of said memories is a First In, First Out memory.

6. The switch of claim 4 wherein said predetermined sequence is a round-robin sequence.

7. A packet switch comprising:

k packet switch modules each having n/k outputs for forwarding data packets received via individual ones of n inputs to said switch to their intended destinations, where k > 1 and n > 1;

an expansion module interposed between said inputs and said packet switch modules, said expansion module comprising, means for dividing each of the data packets received via said inputs into a sequence of segments and supplying the segments to respective concentrator units based on their sequential order, each of said concentrator units having k inputs and including means for supplying a received segment to each of the k inputs and temporarily storing a received segment at one of the k inputs selected as a function of the destination of the associated data packet, and means for combining associated segments temporarily stored in respective concentrator units and supplying the resulting data packet to an associated one of said k packet switch modules so that the resulting data packet may be forwarded to its intended destination.

8. A method of operating a packet switch comprising:

responsive to receipt of data cells via individual ones of n inputs, dividing each of the received cells into a plurality of sequential segments, where n > 1, supplying each of the segments to respective ones of j concentrator units based on the segments sequential order in their associated data cell, where j > 1, within each concentrator unit, supplying a received segment to each of associated inputs and controlling the inputs so that only one of them accepts the received segment for temporary storage, in which such acceptance is based on routing information contained in an associated segment, unloading associated segments in the order that they were stored in different ones of the j concentrator units and combining the segments in the order that were unloaded to form the associated data cell, and supplying the formed data cell to one of k outputs identified as a function of said routing information, where k > 1.

* * * * *